United States Patent [19]
King et al.

[11] 3,816,333
[45] June 11, 1974

[54] METHODS OF INHIBITING CORROSION WITH CONDENSED POLYALKYLENEPOLYAMINE DERIVATIVES

[75] Inventors: Thomas M. King, Creve Coeur; Robert S. Mitchell, Webster Groves, both of Md.

[73] Assignee: Monsanto Company, St. Louis, Mo.

[22] Filed: June 30, 1972

[21] Appl. No.: 267,871

Related U.S. Application Data

[63] Continuation-in-part of Ser. No. 160,550, July 7, 1971, Pat. No. 3,714,067.

[52] U.S. Cl............ 252/389 A, 21/2.5 A, 21/2.5 R, 21/2.7 A, 21/2.7 R, 210/58, 252/181, 252/8.55 E, 252/387, 252/389 R, 260/502.5
[51] Int. Cl................... C23f 11/10, C23f 11/16
[58] Field of Search........... 252/389 A, 389 R, 181, 252/387, 8.55 E; 21/2.7 R, 2.7 A, 2.5 R, 2.5 A; 210/58; 260/502.5

[56] References Cited
UNITED STATES PATENTS

| | | | |
|---|---|---|---|
| 2,917,528 | 12/1959 | Ramsey et al. | 260/502.5 |
| 2,961,311 | 11/1960 | Bersworth et al. | 260/502.5 |
| 3,160,632 | 12/1964 | Toy et al. | 260/502.5 |
| 3,298,956 | 1/1967 | Irani et al. | 260/502.5 |
| 3,346,488 | 10/1967 | Lyons et al. | 260/502.5 |
| 3,395,113 | 7/1968 | Irani et al. | 260/502.5 |
| 3,431,217 | 3/1969 | Hwa | 252/387 |
| 3,483,133 | 12/1969 | Hatch et al. | 252/389 R |

*Primary Examiner*—Leland A. Sebastian
*Assistant Examiner*—Irwin Gluck
*Attorney, Agent, or Firm*—Wayne R. Eberhardt

[57] ABSTRACT

Condensed polyalkylenepolyamine derivatives having the formula

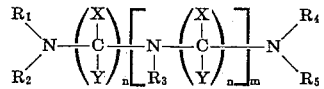

wherein $R_1$, $R_2$, $R_3$, $R_4$, $R_5$, X and Y are hereinafter defined, $n$ is 1–15 and $m$ is 1–20, alone or in combination with zinc, dichromate, certain thiols and 1,2,3-triazoles and mixtures thereof, are disclosed as inhibiting the corrosion of metals by oxygen-bearing waters.

19 Claims, No Drawings

METHODS OF INHIBITING CORROSION WITH CONDENSED POLYALKYLENEPOLYAMINE DERIVATIVES

This application is a continuation-in-part of our co-pending application Ser. No. 160,550, filed July 7, 1971, now issued as U.S. Pat. No. 3,714,067.

The present invention relates to corrosion inhibiting compositions and to methods of inhibiting the corrosion of metal surfaces in contact with an aqueous medium of a corrosive nature. More particularly, this invention relates to methods of inhibiting the corrosion of metal surfaces by utilizing in the corrosive aqueous medium a condensed polyalkylenepolyamine derivative either alone or in combination with a water-soluble zinc salt, a dichromate, certain thiols, 1,2,3-triazoles and mixtures thereof.

The present invention has special utility in the prevention of the corrosion of metals which are in contact with circulating water, that is, water which is moving through condensers, engine jackets, cooling towers, evaporators or distribution systems, however, it can be used to prevent the corrosion of metal surfaces in other aqueous corrosive media. This invention is especially valuable in inhibiting the corrosion of ferrous metals including iron and steel (also galvanized steel) and non-ferrous metals including copper and its alloys, aluminum and its alloys and brass. These metals are generally used in circulating water systems.

The major corrosive ingredients of aqueous cooling systems are primarily dissolved oxygen and inorganic salts, such as the carbonate, bicarbonate, chloride and/or sulfate salts of calcium, mganesium and/or sodium.

It is, therefore, a primary object of this invention to provide new corrosion inhibiting methods.

It is another object of this invention to provide new corrosion inhibiting methods for ferrous metals including iron and steel and non-ferrous metals including copper and brass.

It is another object of this invention to provide new and corrosion inhibiting methods for ferrous metals including iron and steel and non-ferrous metals including copper and brass in contact with an aqueous corrosive medium.

It is another object of this invention to provide new corrosion inhibiting methods for ferrous metals including iron and steel and non-ferrous metals including copper and brass in contact with cooling waters.

Other advantages and objects of the present invention will be apparent from the following discussion and appended claims.

It has been found that certain condensed polyalkylene-polyamine derivatives corresponding to the following formula (I) 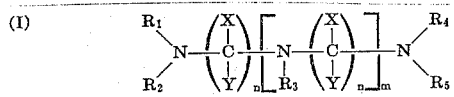

unexpectedly function as corrosion inhibitors when used alone or in combination with zinc, dichromate, certain thiols and 1,2,3-triazoles and mixtures thereof in aqueous or water systems containing metals or in contact with metals.

In the Formula I, $R_1$, $R_2$, $R_4$ and $R_5$ are alike or unlike and are from the group of radicals (II) 

(III) 

and (IV) 

with the proviso that at least one $-C(X)(Y)PO_3M_2$ group is present at all times and is $R_1$, $R_2$, $R_4$ or $R_5$.

In formula I, $R_3$ is an alkyl group containing from 1 to 20, preferably 1 to 8 carbon atoms such as methyl, ethyl, propyl and the like.

In formula I and (partial) Formula II, X and Y are each alike or unlike and are from the group hydrogen and alkyl containing from 1 to 8, preferably 1 to 4 carbon atoms.

In formula I, n has a value of from 1 through 15 and m is from 1 through 20.

In formula I and (partial) Formula II and III, M is a metal ion or hydrogen or any cation which will yield sufficient solubility for the desired end-use. The aforementioned metal ions are from the group of metals alkali metals such as sodium, lithium, potassium, alkaline earth metals such as calcium and magnesium, aluminum, zinc, cadmium, manganese, nickel, cobalt, cerium, lead, tin, iron, chromium, and mercury. Also included are ammonium ions and alkyl ammonium ions. In particular, those alkyl ammonium ions derived from amines having a low molecular weight, such as below about 300, and more particularly the alkyl amines, alkylene amines, and alkanol amines containing not more than two amine groups, such as ethyl amine, diethyl amine, propyl amine, propylene diamine, hexyl amine, 2-ethylhexylamine, N-butylethanol amine, triethanol amine, and the like, are the preferred amines. It is to be understood that the preferred metal ions are those which render the compound a water-soluble salt, e.g., sodium.

It is to be understood that all of the compounds falling within the above Formula I and as heretofore defined are generically described herein as "polyamine" or "polyamines". In other words then, the acids, salts and mixtures thereof are all generically described herein as polyamines.

Illustrative (but without limitation) of some of the present invention corrosion inhibitors are shown below.

(I) 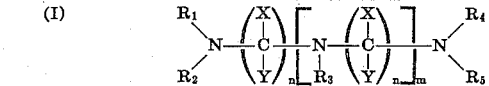

| Compound No. | R₁ | R₂ | R₃ | R₄ | R₅ | X | Y | n | m |
|---|---|---|---|---|---|---|---|---|---|
| 1 | -CH₂PO₃H₂ | -CH₂PO₃H₂ | -CH₃ | -CH₂PO₃H₂ | -CH₂PO₃H₂ | H | H | 3 | 1 |
| 2 | do. | do. | do. | do. | do. | do. | do. | 6 | 1 |
| 3 | do. | do. | do. | do. | do. | do. | do. | 12 | 1 |
| 4 | do. | do. | do. | do. | do. | do. | do. | 3 | 8 |
| 5 | do. | do. | do. | do. | do. | do. | do. | 3 | 15 |
| 6 | -CH₂COOH | -CH₂COOH | -CH₃ | do. | do. | do. | do. | 3 | 1 |
| 7 | do. | do. | do. | do. | do. | do. | do. | 6 | 1 |
| 8 | do. | do. | do. | do. | do. | do. | do. | 12 | 1 |
| 9 | do. | do. | do. | do. | do. | do. | do. | 3 | 8 |
| 10 | do. | do. | do. | do. | do. | do. | do. | 3 | 15 |
| 11 | -CH₂PO₃H₂ | -CH₂PO₃H₂ | -CH₃ | -CH₂COOH | -CH₂COOH | do. | do. | 3 | 1 |
| 12 | do. | do. | do. | do. | do. | do. | do. | 6 | 1 |
| 13 | -CH₂CH₂OH | -CH₂CH₂OH | -CH₃ | -CH₂PO₃H₂ | -CH₂PO₃H₂ | do. | do. | 3 | 1 |
| 14 | do. | do. | do. | do. | do. | do. | do. | 6 | 1 |
| 15 | do. | do. | do. | do. | do. | do. | do. | 12 | 8 |
| 16 | do. | do. | do. | do. | do. | do. | do. | 3 | 15 |
| 17 | do. | do. | do. | do. | do. | do. | do. | 3 | 1 |
| 18 | -CH₂PO₃H₂ | -CH₂PO₃H | -C₂H₅ | -CH₂CH₂OH | -CH₂CH₂OH | do. | do. | 3 | 1 |
| 19 | do. | do. | do. | do. | do. | do. | do. | 6 | 1 |
| 20 | -CH₂PO₃Na₂ | -CH₂PO₃Na₂ | -CH₃H₇ | -CH₂PO₃Na₂ | -CH₂PO₃Na₂ | do. | do. | 3 | 1 |
| 21 | do. | do. | do. | do. | do. | do. | do. | 6 | 1 |
| 22 | -CH₂PO₃(NH₄)₂ | -CH₂PO₃(NH₄)₂ | -CH₃ | -CH₂PO₃(NH₄)₂ | -CH₂PO₃(NH₄)₂ | do. | do. | 3 | 1 |
| 23 | CH₂PO₃Zn | CH₂PO₃Zn | CH₃ | CH₂PO₃Zn | CH₂PO₃Zn | do. | do. | 6 | 1 |
| 24 | CH₂COONa | CH₂COONa | CH₃ | CH₂PO₃Na₂ | CH₂PO₃Na₂ | do. | do. | 3 | 1 |
| 25 | CH₂PO₃H₂ | CH₂PO₃H₂ | CH₃ | CH₂PO₃H₂ | CH₂PO₃H₂ | do. | do. | 15 | 20 |

The polyamines falling within the aforegoing Formula I are prepared according to the disclosure set forth in my copending patent application filed concurrently herewith and which is incorporated herein by reference.

It has been found that to effectively inhibit corrosion, at least 3 parts per million, preferably from about 10 parts per million (ppm) to about 500 parts per million, more preferably from about 10 parts per million to about 150 parts per million, of the polyamine should be utilized in the corrosive medium. It is to be understood that greater than 500 ppm of polyamine can be utilized where one so desires as long as the desired end result is substantially achieved or these higher amounts are not detrimental to the water system. Amounts as low as 1 ppm are found to be effective.

The polyamine corrosion inhibitors of the present invention are effective in both an acidic or basic corrosive media. The pH can range from about 4 to about 12. For example, compound No. 1, heretofore set forth, when used in amounts from about 3 parts per million to about 100 parts per million is an effective corrosion inhibitor in a corrosive medium where the pH is from about 4 to about 12.

In conjunction with the utilization of the polyamine per se as corrosion inhibitors, it has also been found that there exists a synergistic effect on corrosion inhibition between the polyamine and the zinc ion; that is, the use of the polyamine with the zinc ion more effectively inhibits corrosion than does an equal concentration of the polyamine or the zinc ion alone. (The zinc ion is used in approximately the same molar concentration as the polyamine, e.g., a suitable corrosion inhibitor may consist of 10 ppm of zinc ion plus 50 ppm of said polyamine.) It is to be understood, then, that the present invention also encompasses a corrosion inhibition composition containing a mixture of the polyamine and a zinc-containing material (i.e., a water-soluble zinc salt) which is capable of forming the zinc ion in an aqueous solution.

Illustrative examples of the zinc-containing material (water-soluble zinc salt) which are set forth for exemplary purposes only and hence non-restrictive, include zinc acetate, zinc bromate, zinc benzoate, zinc borate, zinc bromide, zinc butyrate, zinc caproate, zinc carbonate, zinc chlorate, zinc chloride, zinc citrate, zinc fluoride, zinc fluosilicate, zinc formate, zinc hydroxide, zinc d-lactate, zinc laurate, zinc permanganate, zinc nitrate, zinc hypophosphite, zinc salicylate, zinc sulfate and zinc sulfite. The preferred water-soluble zinc salt is zinc sulfate. It is to be understood that it is within the scope of the present invention that the zinc ion can be supplied in part or wholly by using the zinc salt of the acid form of the polyamine.

The polyamine and the zinc containing material, which is, in essence, a water soluble zinc salt, may be mixed as a dry composition and can be fed into a water system containing the metals heretofore described to be protected. Such a composition having maximum synergism between the polyamine and the zinc ion containing material comprises from about 2% to about 80% by weight of the water soluble zinc salt and from about 20% to about 98% by weight of the polyamine, all weights being predicated upon the total weight of the mixture. Preferably the weight of the composition comprises from about 10% to about 60% by weight of the water soluble zinc salt and from about 40% to about 90% by weight of the polyamine.

A combination of about 3 to 100 ppm of the polyamine and about 0.5 to about 100 ppm zinc ion will inhibit corrosion in most water systems; the most preferred concentration range is about 5 to 25 ppm polyamine and about 5 to 25 ppm zinc ion. It is to be understood, however, that those concentrations are not in any manner meant to limit the scope of the present invention.

It has also been found that synergism exists between the polyamine and chromate or dichromate. Because chromate and dichromate are each readily converted into the other by a change in pH, it is understood that both will be simultaneously present at most pH's, even though only one is mentioned.

Corrosion is most water systems may be inhibited by adding from about 1 to about 100 ppm of polyamine and from about 1 to about 100 ppm of the chromate or dichromate; preferably from about 5 to 25 ppm polyamine and from about 5 to 25 ppm chromate or dichromate is added. It is to be understood that larger amounts or smaller amounts of each material can be utilized if one so desires.

Suitable chromates for use in the composition and process of this invention include, for exemplary purposes only, sodium dichromate dihydrate, anhydrous sodium chromate, sodium chromate tetrahydrate, sodium chromate hexahydrate, sodium chromate decahydrate, potassium dichromate, potassium chromate, ammonium dichromate, and chromic acid. In other words, the chromium compound used is any water soluble hexavalent compound of chromium and is preferably an alkali metal chromate or dichromate heretofore described.

In most cases, an effective corrosion inhibition composition contains a mixture of from about 1% to about 60% and preferably from about 10% to about 40%, of the water soluble inorganic chromate, based on the combined weight of the chromate and polyamine. The use of chromates per se is further described in U.S. Pat. No. 3,431,217 and the publications cited in this patent, all of which are incorporated herein by reference.

It has also been found that compositions of the polyamine, zinc ion, and chromate or dichromate are useful in inhibiting the corrosion of metals. The inhibiting action of zinc (supplied in the form of a water soluble zinc salt heretofore mentioned) and dichromate compositions has been shown in U.S. Pat. No. 3,022,133, which is incorporated herein by reference. Thus, all three components of this composition are mutually synergistic. The coaction of zinc and dichromate illustrated in U.S. Pat. No. 3,022,133 remains unaffected in the presence of the polyamine and the other ingredients of the inhibitor compositions mentioned herein. In other words, then, it is within the scope of the present invention to provide a corrosion inhibiting composition containing the polyamine, a water soluble zinc salt and a chromate and/or dichromate.

Especially useful combinations of polyamine, chromate and zinc exist in the range of from about 1 to about 100 ppm of polyamine, from about ½ to about 50 ppm of the chromate or dichromate, and from about ½ to 50 ppm of the zinc ion. The preferred range is from about 2 to 30 ppm polyamine, and from about 1 to 15 ppm chromate or dichromate, and from about 1 to about 15 ppm zinc ion.

Where the water systems are in contact with copper per se or copper-containing metals, it is desirable to use, along with the polyamine (either alone or in combination with the zinc ion and/or dichromate or chromate), a 1,2,3-thiazoles or a thiol of a thiazole, an oxazole, or an imidazole as described respectively in U.S. Pat. Nos. 2,941,953; 2,742,369; and 3,483,133; all of which patents are incorporated herein by reference. These azoles are referred to herein as thiols and 1,2,3-thiazoles. These thiols and 1,2,3-thiazoles are found effective in inhibiting the attack of the polyamine on copper.

The preferred 1,2,3-triazole is 1,2,3-benzotriazole of the formula

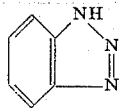

The preferred thiols of a thiazole, an oxazole, or an imidazole are 2-mercaptothioazole

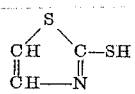

2-mercaptobenzothiazole

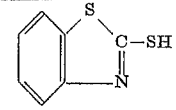

2-mercaptobenzoxazole

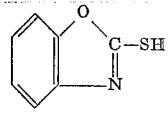

and 2-mercaptobenzimidazole

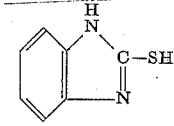

The amounts of thiol or 1,2,3-thiazole used will depend upon the particular water system. Where the water system containing copper is an open or once through system from about 3 to about 100 ppm polyamine, about 0.05 to 5 ppm thiol or 1,2,3-triazole, and up to about 100 ppm zinc ion are generally satisfactory concentrations; preferably the concentrations are about 5 to 25 ppm polyamine, about 0.5 to 2 ppm triazole or thiol, and about 5 to 25 ppm zinc ion.

A dry composition may be made which may be fed into the water system containing copper. Such a composition would consist of about 20% to 90% polyamine; about 1% to 10% thiol or 1,2,3-triazole, and up to about 79% soluble zinc salt; preferably, it would consist of about 38% to 90% polyamine, about 2% to 10% thiol or 1,2,3-triazole, and up to about 60% soluble zinc salt.

It is within the scope of the present invention that the corrosion inhibitors of this invention may be used in conjunction with other materials (water treating chemicals); in some instances, there can be a cooperative effect therebetween. The following is a list of these materials and publications wherein such materials are utilized in a similar fashion in conjunction with corrosion inhibition.

1. Water-soluble polycarboxylic acids from the group adipic, succinic, azelaic, suberic, sebacic, pimelic, and glutoric acids and hydroxypolycarboxylic acids having from 4 to 10 carbon atoms and at least 2 carboxylic acids or an alkali metal or ammonium salt thereof—note British Pat. No. 1,230,172;
2. Acetodiphosphonic acids and salts thereof—note German Pat. No. 2,115,427;
3. Lignins, lignosulphonate, starch, sodium mannuronate, agar-agar, polyelectrolytes which contain the group

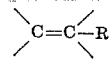

in which R is nitrile, amide, carboxyl or carboxylalkyl and which have a molecular weight of 5,000 to 15,000,000 and water-soluble salts thereof—note U.S. Pat. No. 3,547,817;
4. Amino tri(methyl phosphonic acid) and mono- and poly-phosphonic acids—note U.S. Pat. No. 3,510,436;
5. Polyacrylic acid, polyacrylamide or partially hydrolyzed acrylamide—note U.S. Pat. No. 3,505,238;

6. Aminomethyl phosphonic acid compounds such as those described in U.S. Pat. No. 3,483,133;
7. Derivatives of methanol phosphonic acid or methanol diphosphonic acids such as those described in U.S. Pat. No. 3,532,639;
8. The phosphorus-containing polar organic liquids described in U.S. Pat. No. 3,637,790;
9. Leucocyanidin-catechin polymers, carbamates and sodium bisulfate which are described in U.S. Pat. No. 3,518,203;
10. Lignosulfonate mixed sugar aldonate polymeric materials such as those described in German patent publication No. 2,123,808;
11. Ethylene oxide-propylene oxide polymeric corrosion inhibition compositions containing phosphates, borates, nitrites, silicates and benzoates such as described in German patent publication No. 2,054,506;
12. 1-hydroxy ethylidene-1,1-diphosphonic acid and water-soluble orthophosphates such as those described in British Pat. No. 1,243,347;
13. A water-dispersible tannin compound and a HCN modified lignosulphate and/or an HCN modified naphthalene sulphonate such as those described in British Pat. No. 1,244,123;
14. Silicate materials such as those described in U.S. Pat. No. 3,630,930;
15. Polyfunctional phosphated polyol esters such as those described in U.S. Pat. No. 3,580,855;
16. Sulfonated lignites such as those described in U.S. Pat. No. 3,629,105;
17. The polyphosphonic acids such as those described in U.S. Pat. No. 3,619,427;
18. Molecularly dehydrated phosphates and phosphonates such as those described in U.S. Pat. No. 3,483,133;
19. Molybdates such as those described in "An Electrochemical Study of Heteropoly Molybdates as Cooling Water Corrosion Inhibitors", A. Weisstuch and C. E. Schell, Paper No. 104 presented at the March, 1972 annual meeting in St. Louis, Mo. of the National Association of Corrosion Engineers (NACE).
20. Inorganic Phosphates including orthophosphates.
21. Calcium and magnesium salts such as calcium or magnesium chlorides, sulfates, nitrates and bicarbonates.
22. Cationic organic compounds such as those described in German Patent publication No. 2,063,208 and German Patent publication No. 2,063,209.
23. Fluidizing polymers such as those described in The Oil and Gas Journal, July 5, 1971, pages 104–5; Plant Engineering, December, 1965, pages 133–5; and Chemical Engineering, Dec. 6, 1965, pages 164–8.
24. The scale and corrosion inhibitors such as those described in U.S. Pat. Nos. 3,123,640; 3,123,641; 3,141,905; 3,462,365; 3,477,956; 3,480,083; 3,487,018; 3,518,204; 3,580,855; 3,591,513; 3,592,764; 3,592,834; 3,596,766; 3,597,352; 3,617,578; 3,620,974 and 3,644,205.
25. And mixtures of the above materials listed in items 1 through 24.

All of the above publications are to be considered as incorporated herein by reference.

In conjunction with the Examples hereinafter set forth, two tests are conducted to determine the effectiveness of the corrosion inhibitors of the present invention in different corrosive media, i.e., ordinary tap water and synthetic cooling tower water.

Test 1 was conducted at room temperatures, about 70°F., wherein several coupons of mild steel (S.A.E 1018) having dimensions of 5 cm × 3.5 cm × 0.32 cm were thoroughly cleaned using a commercially available cleansing powder and rinsed with distilled water and acetone. After the coupons were weighed, they were mounted on brackets and continuously immersed and removed from the corrosion composition, i.e., ordinary tap water, so that the coupons remain immersed in the composition for 60 seconds and then remained out of solution, exposed to air for 60 seconds. This procedure was continued for a definite length of time (in hours) after which the coupons were withdrawn and the corrosion products on the coupons were removed by using a soft brush.

The coupons were rinsed with distilled water and acetone and then reweighed. The loss in weight (in milligrams) was then appropriately inserted into the equation:

$KW/DAT$ = Corrosion in mills per year wherein
W = weight loss during tests in milligrams;
D = specific gravity of the metal;
A = exposed surface area in square cm; and
T = time of exposure to solution in hours
K = 3402 in order to determine the corrosion that has taken place expressed in terms of mills of penetration per year (m.p.y.). The corrosion rate of the coupons protected by a corrosion inhibitor can then be compared to the corrosion rate of the unprotected coupons. A decrease in the corrosion rate indicates the effectiveness of the corrosion inhibitor.

In tests of this nature where the aqueous corrosive medium is ordinary tap water at room temperature, any corrosion rate less than that corrosion rate of the said medium is desired and rates of less than 5 m.p.y. are highly desired and substances that give this value or lower are considered excellent. This does not mean, however, that substances having a corrosion rate of more than 5 m.p.y. are not valuable; depending upon the particular conditions a compound having a higher corrosion rate may be used, as in an instance where the equipment will be used, only for a short period of time.

A cooling water system was constructed on a small scale to approximate actual conditions for Test 2. From a five gallon glass tank containing synthetic cooling water, a hose leads into a 6 in. glass jacket which surrounds a mild steel pipe. A hose leads from the jacket into a glass condenser and then back to the tank. Air is added to the system at the condenser in order to match an actual operation in which air is absorbed by the cooling water. Steam is passed through the steel pipe which is enclosed by the glass jacket.

Four mild steel coupons were weighed and then mounted in the tank. After exposure the steel pipe was checked visibly for signs of corrosion and the corrosion rate of the coupons was calculated. Synthetic cooling water was prepared to approximate actual cooling water as follows:

| | |
|---|---|
| $Ca^{++}$ | 200 ppm |
| $Mg^{++}$ | 55 ppm |
| $Na^{+}$ | 320 ppm |
| $Cl^-$ | 600 ppm |
| $SO_4^{--}$ | 500 ppm |
| $HCO_3^-$ | 58 ppm |
| Total Dissolved Solids of Distilled Water | 1,733 ppm |

A circulating cooling water system contains a high concentration of inorganic salt or ions much higher than ordinary tap water as can be seen from the formulation for synthetic cooling tower water. Likewise a cooling water system is operated at high temperatures usually 50°C or higher. Primarily because of these two factors the acceptable corrosion rates in cooling waters is less than 10 m.p.y. therefore, corrosion inhibitors having corrosion rates less than 10 m.p.y. are considered good and commercially acceptable.

The corrosion inhibiting compositions of this invention can be manufactured via a number of methods which will give good protection against corrosion. For example, the polyamine either in the form of its acid or salt per se or in combination with the water-soluble zinc salt, chromate, dichromate, thiols and 1,2,3-thiazole can simply be dissolved by intermixing them into the aqueous corrosive medium. Via another method, they can be dissolved separately in water or another suitable solvent and then intermixed into the aqueous corrosive medium.

Various means are available to insure that the correct proportion of corrosion inhibitor is present in the corrosive medium. For example, a solution containing the said corrosion inhibitor can be metered into the corrosive medium by a drip feeder. Another method is to formulate tablets or briquettes of a "solid" polyamine (and other ingredients) and these can then be added to the corrosive medium. The said solid, after briquetting, can be used in a standard ball feeder so that the solid is released slowly into the corrosive medium.

The invention will be further illustrated but is not limited by the following examples:

EXAMPLE I

Three separate portions consisting each of 600 ml of aqueous corrosive medium are individually treated with the indicated polyamine so that it contains separately 5, 50 and 100 parts per million of polyamine. (Where the acid form is used, it is converted to the sodium salt by the addition of sufficient NaOH to maintain the medium at pH 9.0 to 9.5.) Test 1 as described hereinbefore is conducted using 1018 S.A.E mild steel coupons measuring 5 cm × 3.5 cm × 0.32 cm. The corrosive medium is a sample of water obtained from the St. Louis County Water Company having a pH from about 9.0 to about 9.5 and a hardness of about 100 to about 110 parts per million as calcium carbonate. Test 1 is conducted according to the procedure hereinbefore outlined for 90 hours. Six hundred ml. of the untreated aqueous corrosive medium is tested as a control. The data are illustrated in Table 1.

Test 1 is also conducted on a commercially available corrosion inhibitor, containing some zinc about 1 to about 4% by weight but mostly tetra sodium pyrophosphate about 40 to about 60% by weight; these data are shown in Table 1.

TABLE 1

Corrosion Rates on Mild Steel (S.A.E. 1018) Coupons
5 cm × 3.5 cm × 0.32 cm pH 9.0 to 9.5 of the
Corrosive Media

| Corrosion Inhibitor | Concentration ppm | Time (hrs) | Corrosion Rate (m.p.y.) |
|---|---|---|---|
| Corrosion Medium | — | 96 | 25.2 |
| Polyamine Compound No. | | | |
| 1 | 5 | 96 | 8.1 |
| 1 | 50 | 96 | 4.7 |
| 1 | 100 | 96 | 2.2 |
| 2 | 5 | 96 | 10.1 |
| 2 | 50 | 96 | 8.4 |
| 2 | 100 | 96 | 5.2 |
| 4 | 5 | 96 | 4.7 |
| 4 | 50 | 96 | 2.6 |
| 4 | 100 | 96 | 2.0 |
| 6 | 5 | 96 | 9.7 |
| 6 | 50 | 96 | 4.4 |
| 6 | 100 | 96 | 3.8 |
| 13 | 5 | 96 | 11.5 |
| 13 | 50 | 96 | 5.0 |
| 13 | 100 | 96 | 4.2 |
| 18 | 5 | 96 | 6.9 |
| 18 | 50 | 96 | 3.9 |
| 18 | 100 | 96 | 3.0 |
| 20 | 5 | 96 | 8.2 |
| 20 | 50 | 96 | 4.6 |
| 20 | 100 | 96 | 2.8 |
| 22 | 5 | 96 | 11.3 |
| 22 | 50 | 96 | 6.3 |
| 22 | 100 | 96 | 3.4 |
| Corrosion Medium | — | 96 | 29.6 |
| Zinc - Tetra Sodium Pyrophosphate (Zinc 1% 4%, tetra sodium pyrophosphate 40% to 60% | 5 | 96 | 15 |
| | 50 | 96 | 6.8 |
| | 100 | 96 | 4.1 |

The data in Table 1 show that the polyamines are an effective corrosion inhibitor. Table 1 shows that these polyamines are at least as good as and in some cases superior to the commercially available zinc tetra sodium pyrophosphate inhibitor. As pointed out before, substances that reduce the corrosion rates of mild steel to less than 5 m.p.y. in ordinary tap water are considered excellent. Therefore, it can readily be appreciated that the polyamines of the present invention are effective corrosion inhibitors.

EXAMPLE II

Test 2, as described hereinbefore, is conducted to determine the effectiveness of the indicated polyamine (Example I) as a corrosion inhibitor in cooling water. The polyamines are added to the five gallon tank containing about 16,000 ml. of synthetic cooling tower water (having a flow rate of 2,640 ml./min.), as set forth above, so that said water contains 5, 50, and 100 parts per million of the polyamine. The temperature of the synthetic cooling water is 50°C. Mild steel coupons (ASTM A-285) measuring 2.5 cm × 5 cm × 0.6 cm are cleaned with a commercially available cleansing powder and weighed. They are then mounted on brackets in the five gallon tank. After exposure, they are reweighed and their corrosion rates are calculated.

A blank solution containing no polyamine is used as a control to determine the corrosion rates of mild steel coupons in untreated synthetic cooling tower water.

The data show that the polyamine corrosion inhibitors at greater than 50 ppm reduce the corrosion rate to less than 10 m.p.y. (the control corrosion medium is about 24.6 m.p.y.), which is the generally acceptable rate for a corrosion inhibitor.

A visual inspection of the mild steel pipe through which the steam passes and which is cooled by the synthetic cooling water treated with polyamine shows a very minute amount of corrosion, another indication of the effectiveness of the novel compound of the present invention.

A commercial corrosion inhibitor containing 2% to 4% by weight of zinc and 40% to 60% by weight of tetra sodium pyrophosphate, is used to treat the synthetic cooling water and is tested in the same manner as Example II. The corrosion rates of the coupons are more than 10 m.p.y. and a significant amount of corrosion forms on the mild steel pipe through which the steam passes.

It can readily be appreciated that these polyamines are good corrosion inhibitors when used in cooling waters and especially when used in heat-exchanging systems.

EXAMPLE III

Example I (above) is repeated with the exception that in addition to the polyamine (5, 50 and 100 ppm) corrosion inhibitor, there is added sufficient amounts of zinc sulfate in order to provide respectively 5, 50 and 100 ppm of zinc ion in the corrosion medium. The synergistic corrosion inhibitor, i.e., the indicated polyamine plus the zinc sulfate, shows that at all three concentrations (i.e., 5, 50 and 100 ppm of each) the corrosion rates are substantially less than the rates using the corrosion medium without this mixture and is on the average 25% less than those rates obtained using only the polyamine per se.

EXAMPLE IV

Example I (above) is repeated with the exception that in addition to the polyamine (5,50 and 100 ppm) corrosion inhibitor, there is added respectively 5, 50 and 100 ppm sodium dichromate to the corrosion medium. The synergistic corrosion inhibitor, i.e., the indicated polyamine plus the sodium dichromate, shows that at all three concentrations (i.e., 5, 50 and 100 ppm of each), the corrosion rate is less than the rate using the corrosion medium without this mixture and is on the average about 14 to 21% less than those rates obtained using only the polyamine per se.

EXAMPLE V

A series of separate and individual corrosion inhibitors consisting of a mixture of the indicated polyamine (60% by weight), zinc sulfate (20% by weight) and sodium dichromate (20% by weight) are prepared. Example I (above) is then repeated utilizing the above mixture. The resultant data shows that the corrosion rates using this mixture are substantially less than the rates using the corrosion medium without this mixture and is on the average about 31% to 41% less than those rates obtained using only the polyamine per se.

EXAMPLE VI

The corrosion inhibitors as described in the above Examples I, III, IV and V are separately and individually tested in boiler water for their separate corrosive inhibiting effect on red brass and mild steel. The boiler water contains approximately 30–60 parts per million phosphate and approximately 30–60 parts per million sulfate having a pH of about 14. The corrosive tests are carried out at a temperature of 314°C at 1500 psig and with a 50 parts per million of the respective corrosion inhibitor. In each test, approximately 1 liter of boiler blow-down water is charged into a 2 liter bomb and 1 ml. of a stock solution is added to give approximately 50 parts per million of the corrosion inhibitor. Duplicate coupons of mild steel and red brass measuring 5 cm × 3.5 cm × 0.32 cm are scrubbed with a commercially available cleansing powder and weighed. The coupons are then mounted on insulated brackets so that two coupons are in the liquid phase and two coupons are in the vapor phase. After sealing the bomb, the cycle of pumping down with a vacuum pump and filling with nitrogen is repeated four times. The time of the tests are taken to be roughly from the time the temperature reached 150°C after starting to heat till it again reached this temperature after turning off the heat.

The results of these tests show that at temperatures above 300°C the respective corrosion inhibitors significantly reduces the corrosion rates of both red brass and mild steel either completely immersed in the cooling waters or in contact with the vapors of a cooling water system containing the complex. It also demonstrates the stability of the corrosion inhibitors of the present invention at elevated temperatures, over 300°C, for extended periods of time.

In each of the following examples, the indicated polyamine and zinc compound are added to the aqueous corrosive medium so that 50 parts per million of each is present.

EXAMPLE VII

| Ingredients | Parts |
| --- | --- |
| Aqueous corrosive medium | 75,000 |
| Polyamine Compound No. 1 | 2 |
| Zinc sulfate | 2 |

EXAMPLE VIII

| Ingredients | Parts |
| --- | --- |
| Aqueous corrosive medium | 80,000 |
| Polyamine Compound No. 2 | 2.6 |
| Zinc sulfate | 2.6 |

EXAMPLE IX

| Ingredients | Parts |
| --- | --- |
| Aqueous corrosive medium | 90,000 |
| Polyamine Compound No. 6 | 2.3 |
| Zinc sulfate | 2.3 |

EXAMPLE X

| Ingredients | Parts |
| --- | --- |
| Aqueous corrosive medium | 90,000 |
| Polyamine Compound No. 13 | 2.3 |
| Zinc sulfate | 2.3 |

EXAMPLE XI

| Ingredients | Parts |
| --- | --- |
| Aqueous corrosive medium | 90,000 |
| Polyamine Compound No. 14 | 2.3 |
| Zinc sulfate | 2.3 |

EXAMPLE XII

| Ingredients | Parts |
| --- | --- |
| Aqueous corrosive medium | 65,000 |
| Polyamine Compound No. 18 | 1.6 |
| Zinc sulfate | 1.6 |

EXAMPLE XIII

| Ingredients | Parts |
| --- | --- |
| Aqueous corrosive medium | 11,000 |
| Polyamine Compound No. 20 | 2.7 |
| Zinc sulfate | 2.7 |

EXAMPLE XIV

| Ingredients | Parts |
| --- | --- |
| Aqueous corrosive medium | 100,000 |
| Polyamine Compound No. 22 | 2.5 |
| Zinc sulfate | 2.5 |

(The sodium salts of the above Compound Nos. 1, 2, 6, 13, 14 and 18 are used in place of the acid forms.)

Tests 1 and 2 were conducted on each of the above-treated aqueous corrosive media. The corrosion rates in all instances were lower than the untreated corrosive media. These Examples are repeated with the exception that the zinc salt used is zinc chloride (in one repeat) and zinc acetate (in another repeat). Similar results are obtained in both cases as compared to the results obtained using zinc sulfate.

EXAMPLE XV

A compressed ball of a standard weight and dimension is prepared containing the following ingredients in the quantities noted.

| Polyamine Compound No. 1 | 34 |
| Lignosulfite binder (bindarene) | 8 |
| Zinc sulfate | 16 |
| Inert Ingredients | 42 |

The above composition after briquetting is found suitable for mechanically measured addition in water treatment wherein a ball feeder is employed.

EXAMPLE XVI

Example I (above) is repeated with the exception that copper coupons are used instead of mild steel coupons and sufficient amounts of 1,2,3-benzotriazole to provide 1, 5 and 10 ppm thereof in the corrosive media is used in addition to the polyamine. Example XVI is repeated again but without the benzotriazole material. The data shows that when copper coupons are used and the corrosive media contains the indicated polyamine, the corrosion rates are less than when the corrosion media does not contain said polyamine. The data further show that use of the benzotriazole with the polyamine further reduces the corrosion rate.

It is also within the scope of the present invention to utilize silicates, particularly inorganic silicates, in combination with the polyamines. It is known that silicates are effective corrosion inhibitors as exemplified by "Encyclopedia of Chemical Technology", Kirk-Othmer, 1961 by The Interscience Encyclopedia, Inc. New York — Volume 4, pages 487–529, and Volume 12, pages 268–360; this subject matter is to be considered as incorporated herein by reference. (These silicates can be used in the same concentration as the water-soluble zinc salts heretofore mentioned.)

It is found in the repeat of the above Example I that the use of a combination of the indicated polyamine and a liquid (sodium) silicate (having a 3.22:1 ratio of $SiO_2$ to soda) effected a lower corrosion rate than either the polyamine per se or the silicate per se when used separately.

Thus, it may be seen that this invention relates to the indicated polyamines falling within Formula I above as corrosion inhibitors. We do not intend to be limited to any compounds, composition, or methods disclosed herein for illustrative purposes. Our invention may be otherwise practiced and embodied within the scope of the following claims.

What is claimed is:

1. A composition useful for inhibiting the corrosion of metals in a water system consisting essentially of from about 2% to about 80% by weight of a water soluble zinc salt and from about 20% to 98% by weight of a polyamine having the general formula

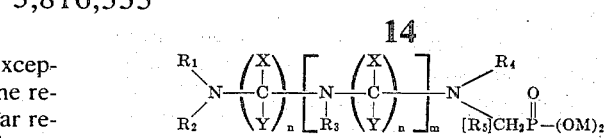

wherein (a) $R_1$, $R_2$, and $R_4$ are alike or unlike and are each selected from the group consisting of

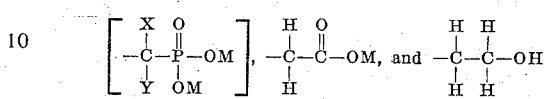

and M is either hydrogen or any cation which will provide sufficient solubility in said aqueous system; (b) $R_3$ is an alkyl group containing from about 1 to 8 carbon atoms; (c) X and Y are each alike or unlike and are selected from the group consisting of hydrogen and alkyl; (d) $n$ has a value of from 1 through 15 and (e) $m$ has a value of from 1 through 20.

2. The composition as set forth in claim 1 wherein X and Y both are hydrogen.

3. The composition as set forth in claim 2 wherein $R_1$, $R_2$, and $R_4$ are each —$CH_2CO_2M$ groups.

4. The composition as set forth in claim 2 wherein M is an ion selected from the group consisting of alkali metals, ammonia, zinc, and mixtures thereof.

5. The composition as set forth in claim 4 wherein the water soluble zinc salt is zinc sulfate and M is sodium.

6. The composition as set forth in claim 1 and additionally containing a water-soluble hexavalent compound of chromium.

7. A composition for inhibiting the corrosion of metals in a water system which contains cuprous metals comprising (1) from about 20% to about 90% by weight of a polyamine having the general formula

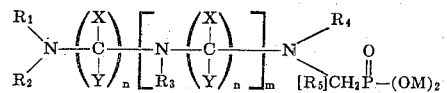

wherein (a) $R_1$, $R_2$, and $R_4$ are alike or unlike and are each selected from the group consisting of

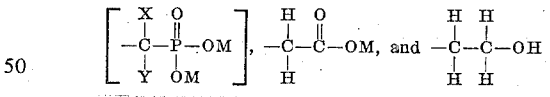

and M is either hydrogen or any cation which will provide sufficient solubility in said aqueous system; (b) $R_3$ is an alkyl group containing from about 1 to 8 carbon atoms; (c) X and Y are each alike or unlike and are selected from the group consisting of hydrogen and alkyl; (d) $n$ has a value of from 1 through 15 and (e) $m$ has a value of from 1 through 20; (2) from about 1% to about 10% by weight of a compound selected from the group consisting of 1,2,3 triazoles, thiols of thiazoles, thiols of oxazoles, thiols of imidazoles, and mixtures thereof, and (3) up to about 79% by weight of a water soluble zinc salt.

8. The composition as set forth in claim 7 wherein said polyamine is selected from the group consisting of

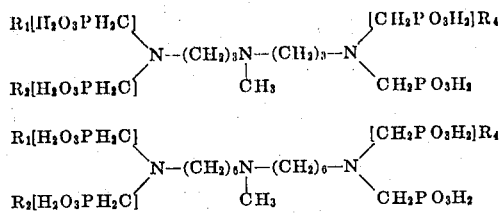

sodium salts thereof and mixtures thereof.

9. The composition as set forth in claim 7 and additionally containing a water-soluble hexavalent compound of chromium.

10. A method of inhibiting the corrosion of metals in a water system comprising maintaining in the water of said system at least 3 parts per million of a polyamine having the general formula

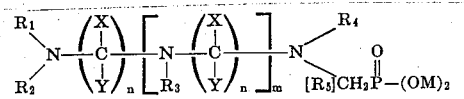

wherein (a) $R_1$, $R_2$, and $R_4$ are alike or unlike and are each selected from the group consisting of

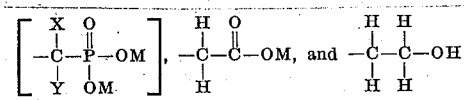

and M is either hydrogen or any cation which will provide sufficient solubility in said aqueous system; (b) $R_3$ is an alkyl group containing from about 1 to 8 carbon atoms; (c) X and Y are each alike or unlike and are selected from the group consisting of hydrogen and alkyl; (d) $n$ has a value of from 1 through 15 and (e) $m$ has a value of from 1 through 20.

11. The composition as set forth in claim 10 wherein X and Y both are hydrogen.

12. The composition as set forth in claim 11 wherein $R_1$, $R_2$, and $R_4$ are each —$CH_2CO_2M$ groups.

13. The composition as set forth in claim 11 wherein M is an ion selected from the group consisting of alkali metals, ammonia, zinc, and mixtures thereof.

14. The method as set forth in claim 10 and additionally containing in said system a water soluble hexavalent compound of chromium.

15. The method as set forth in claim 10 and additionally containing in said system a water soluble zinc salt.

16. The method as set forth in claim 15 and additionally containing in said system a water soluble hexavalent compound of chromium and a water soluble zinc salt.

17. The method as set forth in claim 10 wherein said system contains cuprous metals and the water system additionally contains a compound selected from the group consisting of 1,2,3 triazoles, thiols of thiazoles, thiols of oxazoles, thiols of imidazoles, and mixtures thereof.

18. The method as set forth in claim 17 wherein the water system additionally contains a water soluble zinc salt.

19. A composition useful for inhibiting the corrosion of metals in a water system comprising from about 2% to about 80% by weight of a silicate and from about 20% to about 98% by weight of a polyamine having the general formula

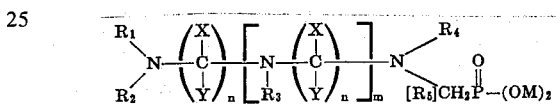

wherein (a) $R_1$, $R_2$, and $R_4$ are alike or unlike and are each selected from the group consisting of

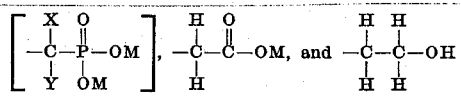

and M is either hydrogen or any cation which will provide sufficient solubility in said aqueous system; (b) $R_3$ is an alkyl group containing from about 1 to 8 carbon atoms; (c) X and Y are each alike or unlike and are selected from the group consisting of hydrogen and alkyl; (d) $n$ has a value of from 1 through 15 and (e) $m$ has a value of from 1 through 20.

* * * * *

PO-1050
(5/69)

UNITED STATES PATENT OFFICE
CERTIFICATE OF CORRECTION

Patent No. 3,816,333     Dated June 11, 1974

Inventor(s) Thomas M. King and Robert S. Mitchell

It is certified that error appears in the above-identified patent and that said Letters Patent are hereby corrected as shown below:

On the title page, in Item 75, both inventors are from Missouri.

In the Table under Columns 3 and 4, $R_3$ of Compound 20 should read $-C_3H_7$.

In Claims 1, 7, 10 and 19, the formula first appearing should read as follows:

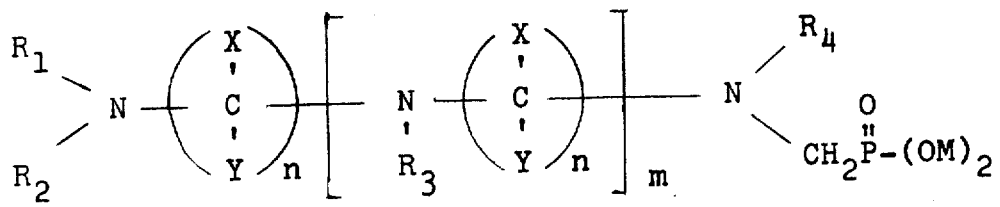

and, two lines below said formula, the expression

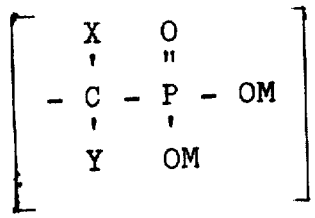

should be deleted.

In Claim 8, the two formulas should read as follows:

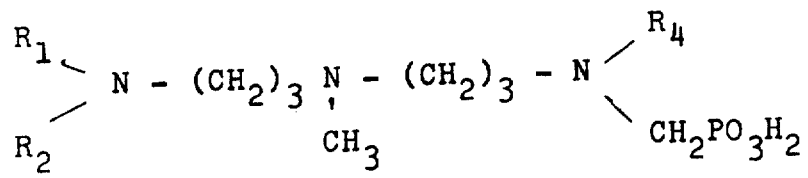

UNITED STATES PATENT OFFICE
CERTIFICATE OF CORRECTION

Patent No. 3,816,333  Dated June 11, 1974

Inventor(s) Thomas M. King and Robert S. Mitchell

It is certified that error appears in the above-identified patent and that said Letters Patent are hereby corrected as shown below:

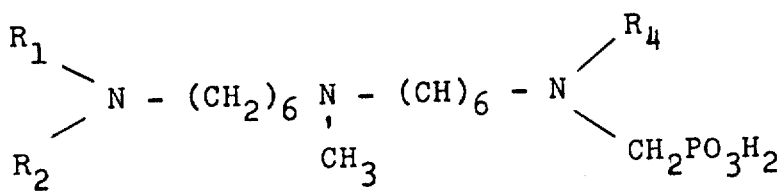

Signed and sealed this 1st day of October 1974.

(SEAL)
Attest:

McCOY M. GIBSON JR.
Attesting Officer

C. MARSHALL DANN
Commissioner of Patents